United States Patent [19]

Göbel et al.

[11] Patent Number: 4,920,520

[45] Date of Patent: Apr. 24, 1990

[54] METHOD OF AND A DEVICE FOR SAFEGUARDING A VEHICLE OR MACHINERY MOVABLE IN SPACE

[75] Inventors: Ewald Göbel; Dieter Maurer, both of Karlsruhe; Rigobert Opitz, Waldbronn, all of Fed. Rep. of Germany

[73] Assignee: IBP Pietzsch GmbH, Ettlingen, Fed. Rep. of Germany

[21] Appl. No.: 241,363

[22] Filed: Sep. 7, 1988

[30] Foreign Application Priority Data

Sep. 8, 1987 [DE] Fed. Rep. of Germany ....... 3730105

[51] Int. Cl.⁵ .............................................. G01S 15/00
[52] U.S. Cl. ...................................... 367/99; 367/909; 367/96
[58] Field of Search ...................... 367/909, 95, 96, 98, 367/104, 173, 188; 901/1; 340/903; 364/434

[56] References Cited

U.S. PATENT DOCUMENTS

| | | | |
|---|---|---|---|
| 3,753,219 | 8/1973 | King, Jr. ............................. | 367/173 |
| 4,465,155 | 8/1984 | Collins ................................ | 367/96 |
| 4,636,996 | 1/1987 | Tsuji .................................... | 367/909 |
| 4,644,237 | 2/1987 | Frushour et al. .................... | 367/909 |

Primary Examiner—Thomas H. Tarcza
Assistant Examiner—Daniel T. Pihulic
Attorney, Agent, or Firm—Rogers & Killeen

[57] ABSTRACT

A method of and a device for safeguarding a vehicle or machinery movable in space, such as a robot, a stacker, an operatorless transporting vehicle or the like against collision, in which by the use of distance sensors, especially ultrasonic sensors with echo time measurement, the distance from an obstacle is measured and a reaction signal is initiated when a preset threshold value is not reached, said method and device being characterized by a time-synchronous actuation of the distance sensors in a compound circuit which in case of a dangerous approach of the vehicle to an obstacle triggers a reaction signal which is either a speed reduction signal or a stop signal. Moreover, the measuring signal can be utilized as a command signal for actively influencing the vehicle movement, e.g. for driving around the obstacle or the like.

21 Claims, 3 Drawing Sheets

METHOD OF AND A DEVICE FOR SAFEGUARDING A VEHICLE OR MACHINERY MOVABLE IN SPACE

The present invention is directed to a method and a device comprising the features specified in the preamble of claim 1 as described in U.S. Pat. No. 3,493,920.

The provision of distance sensors, especially ultrasonic sensors, on vehicles which are controlled in a space or remote-controlled or autonomously movable is known for preventing collision with an obstacle. Such known sensors are clocked serially in order to eliminate measuring errors. But this requires that the measuring cycle of one sensor must be terminated before the measuring cycle of a further sensor is started (European published patent application No. 52 357).

The present invention is based on the object of providing a method and a device of the kind specified in the preamble of claim 1, whereby increased safety against collision with obstacles can be achieved.

To solve the specified object, a method in accordance with the invention is provided with the features set out in claim 1, and a device in accordance with the invention is provided with the features set out in claim 3.

According to the present invention, all distance sensors mounted on the vehicle are combined in an integrated system for time-synchronous joint initiation and measured-value processing. Thereby the risk of collision with an obstacle which is within the range of detection of a sensor that has not been activated, as provided in the prior art, is eliminated.

Preferably the sensors are ultra-sonic sensors for emitting and receiving ultrasonic signals, and all sensors are of the same type, i.e. no different sensors are used to detect different distances as in prior art systems.

Moreover, the method and device of the invention do not need external guide paths as all components to securely guide the vehicle are installed on the vehicle itself and thus enable autonomous cruising of the vehicle.

Due to the synchronous clocking of all sensors a high sensing rate can be achieved which permits the use of higher vehicle speeds than has so far been possible.

The reaction signal may cause a speed reduction or a stop of the vehicle, and advantageously the speed is reduced when a first, greater distance from an obstacle is not reached while an emergency stop is initiated when a second, smaller predetermined distance is not reached. Both distance thresholds can be preset independently.

In addition, the measuring signals from the sensors may be utilized as command signals for actively influencing the vehicle movement in the sense of driving around an obstacle, travelling in parallel to a wall, or the like.

A concrete embodiment of a device in accordance with the preamble of claim 3 is characterised in that the or each ultrasonic sensor is mounted in a receiving means fixed on the vehicle so as to be adjustable in every direction at presettable angular ranges. This permits complete scanning of the environment for obstacles.

This embodiment of the invention enables the replaceable, capacitively decoupled and individually angularly adjustable provision of one or several distance sensors on the vehicle.

Below, embodiments of the invention will be described in detail with reference to schematic drawings, in which.

Figure 1:
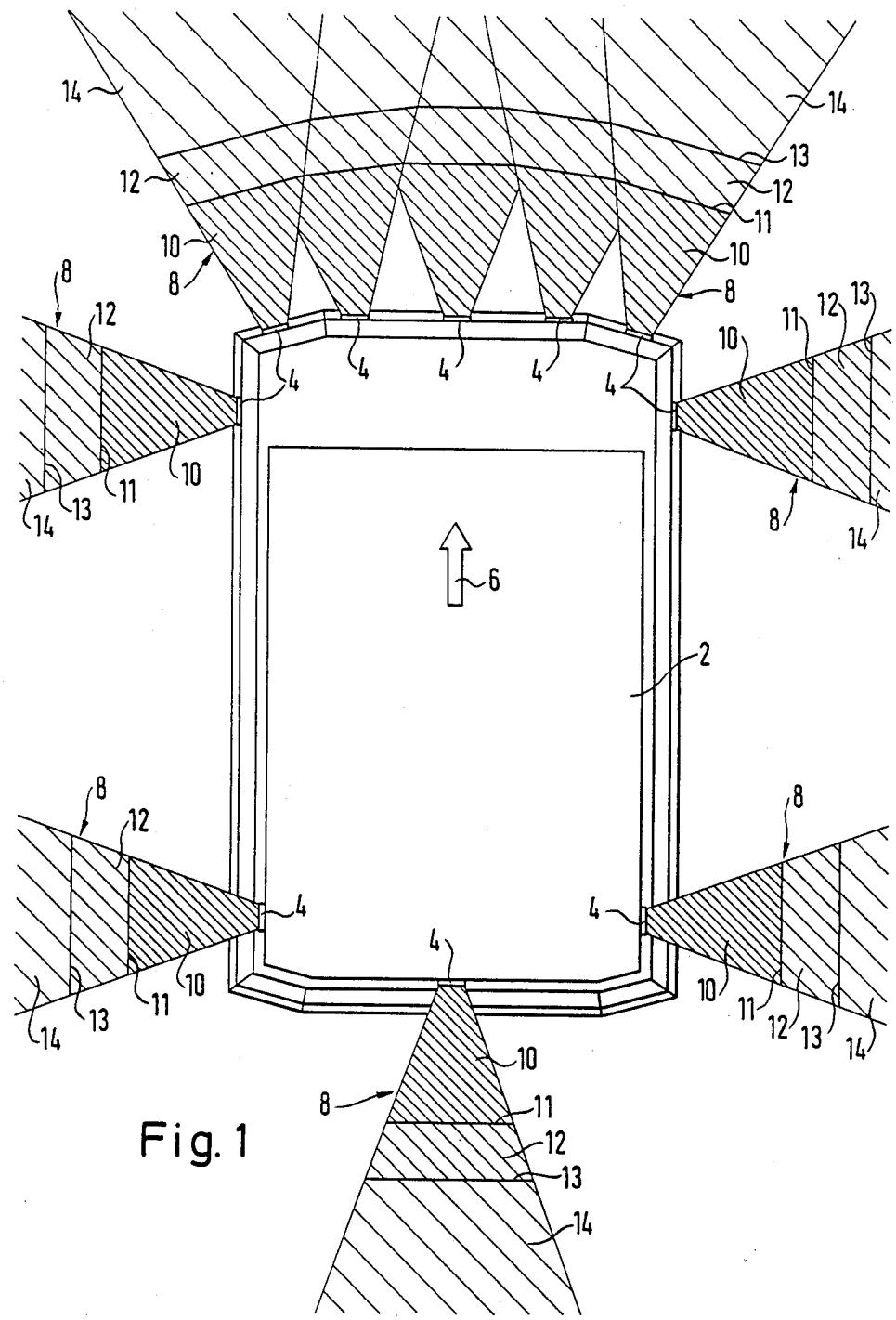
FIG. 1 is a plan view of a vehicle movable in space and having a plurality of ultrasonic sensors mounted thereon.

The vehicle 2 illustrated in FIG. 1 may be an operatorless transporting vehicle of the kind used in modern factories. The front of the vehicle 2 is provided with a total of five ultrasonic sensors 4. Either side of the vehicle 2 has two ultrasonic sensors 4 mounted thereon, while only one ultrasonic sensor 4 is provided on the rear. All sensors are of the same type and construction to emit and receive ultrasonic signals. The main travelling direction of the vehicle 2 is indicated by the arrow 6. In this forward travelling direction the array of ultrasonic sensors is so closely packed that the sensing beams or "lobes" of the ultrasonic sensors 4 overlap already immediately in front of the vehicle whereby a continuous monitoring field is already formed relatively near the front of the vehicle. Each lobe 8 has provided therein a closely hatched area 10, a less closely hatched area 12 and a widely hatched area 14. The border line 11 of the closely hatched area defines a threshold which initiates a stop signal for the vehicle 2. The border line 13 of the less closely hatched area 12 defines a threshold where a speed reduction signal for the vehicle 2 is initiated.

Figure 2:
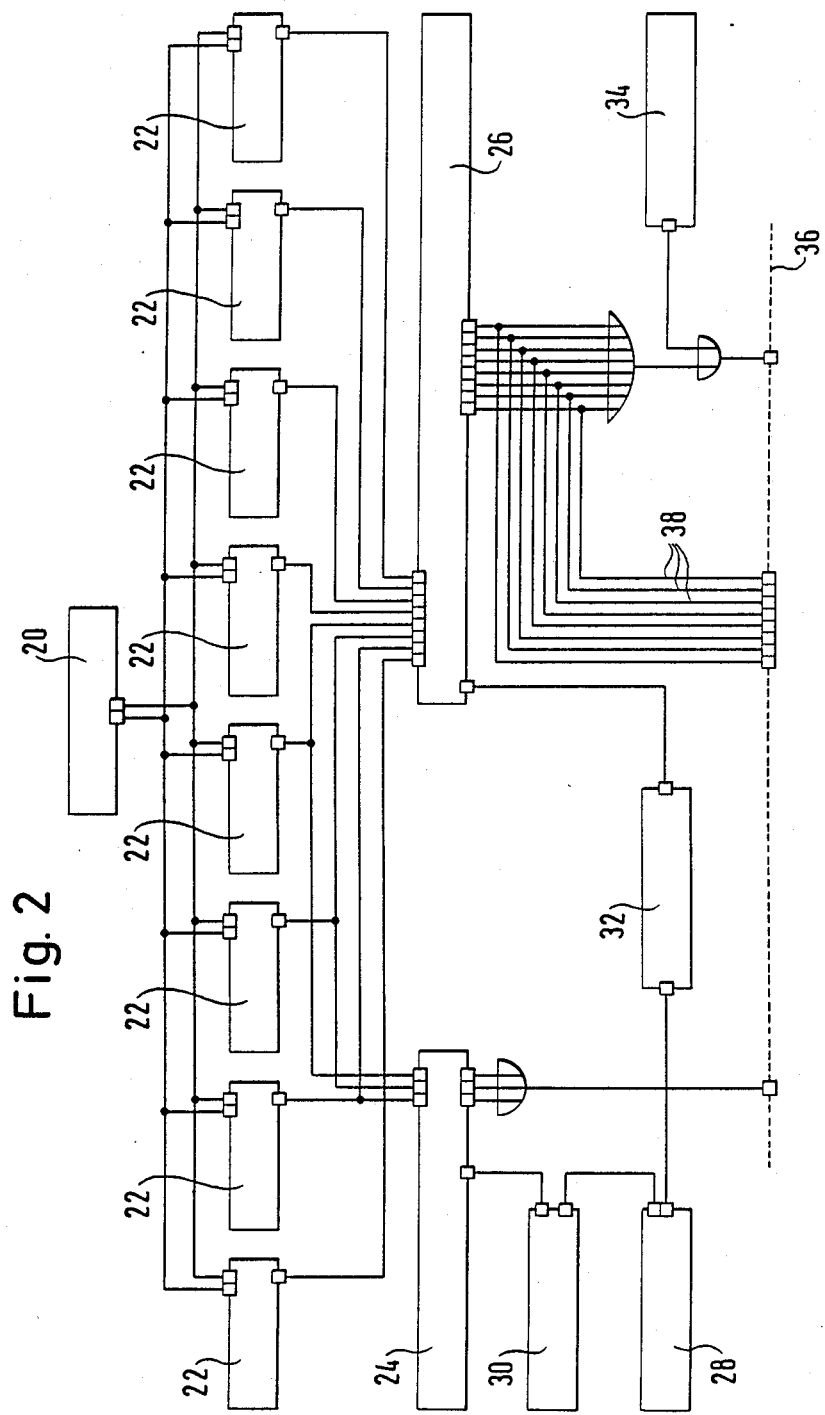
FIG. 2 is a circuit diagram for interconnecting the sensors of FIG. 1 for joint initiation and processing of their measuring signals.

The ultrasonic sensors 4 are triggered by being jointly clocked (measuring cycle), and their measuring signals are processed in a common circuit arrangement schematically illustrated in FIG. 2.

In FIG. 2, a time module 20 is provided for the time-synchronous initiation of the measuring cycles of all distance sensors and of the corresponding counting cycles for distance measurement (measurement of echo time). 22 indicates sensor modules in which one or several ultrasonic sensors are combined.

24 indicates a comparator module for implementing a speed reduction, and 26 indicates a comparator module for implementing an emergency stop of the vehicle 2. The comparator modules 24, 26 can be programmed with corresponding threshold values which are continually present in the comparator modules and may be varied, for instance with preset reachable space values ranging from 0.3 to 10 m.

28 indicates an encoding switch for the manual inputting of threshold values via a threshold module 30 into the comparator module 24 for speed reduction, on the one hand, and via a threshold module 32 into the comparator module 26 for triggering a stop, on the other hand. An independent emergency stop switch 34 is additionally provided for triggering an emergency stop. The comparator modules 24 and 26 and the emergency switch 34 act on an external interface 36 which is indicated by a dotted line. From the comparator module 26, lines 38 extend to the interface 36 to permit sensor identification, i.e. identification of the respective ultrasonic sensor that caused the triggering operation.

The described circuit arrangement operates as follows:

By turning the system on, bith the measuring cycle (repetition of the measuring operation) and the resolution cycle (counting operation for distance measurement) are initiated in time-synchronism in the time module 20 so that all sensor modules 22 are simultaneously initiated. The measuring and resolution rate is variable (a minimum of 120 ms).

The thus initiated sensor modules 22 feed the actual ultrasonic sensors 40 (not illustrated in FIG. 2) and measure the returning echo signals. The distance information is represented in terms of counting pulses of an echo time measurement.

The first echo signal which is less than the predetermined threshold value of the distance from an obstacle initiates a speed reduction in the comparator module 24 or an emergency stop in the comparator module 26. The speed reduction causes deceleration of the initially high vehicle speed and a smooth approach to obstacles.

Additionally, the echo signals may be used as command signals for controlling the drive unit or the steering mechanism of the vehicle 2.

Due to the preset distance for speed reduction and also for emergency stop, each ultrasonic sensor is "programmed" either individually or globally in respect of its safety range or active range, respectively. Thus, any desired safety contours can be produced.

The threshold values for the comparator modules 24, 26 may also be preset—instead of through the manually operated encoding switch—with the help of telemetry or by radio, respectively.

Figure 3:
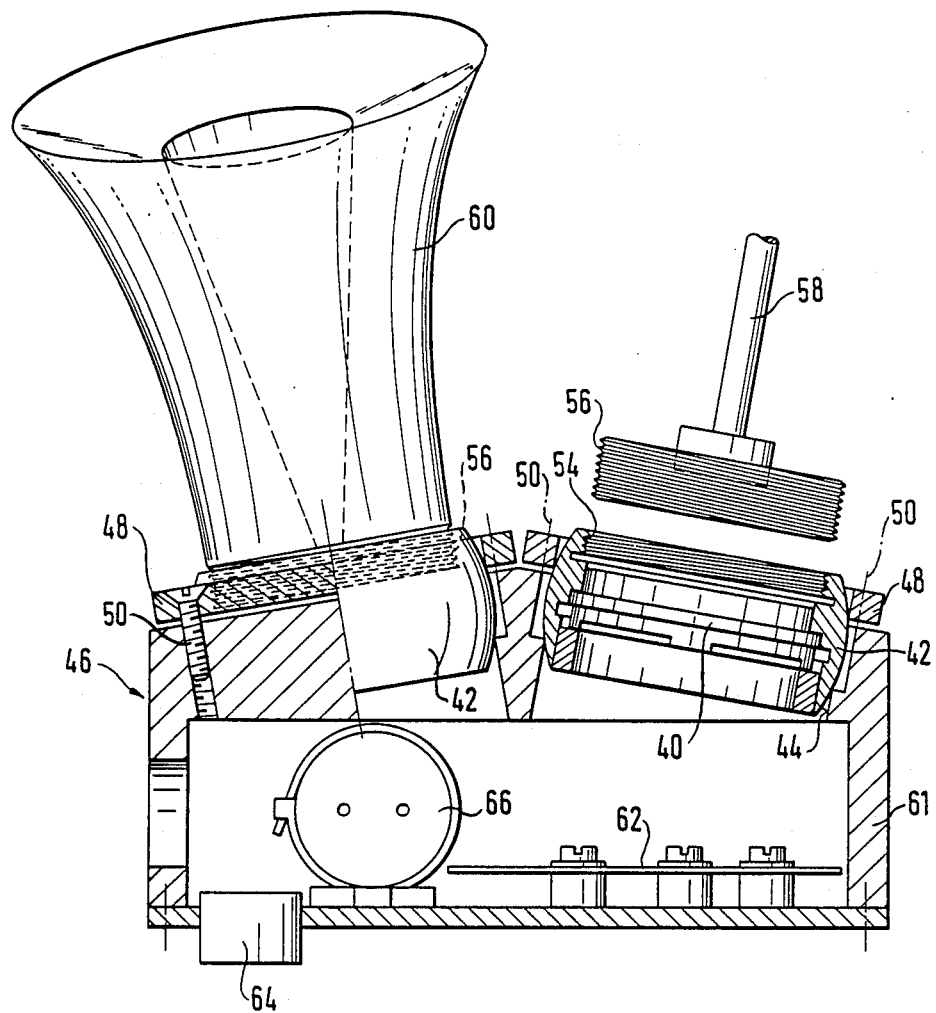
FIG. 3 is a structural embodiment of a system for jointly receiving a plurality of ultrasonic sensors.

FIG. 3 is a structural embodiment of a receiving device for a plurality of ultrasonic sensors 40—two in the present case. Each ultrasonic sensor 40 is held in a spherical swivel head 42 which in its turn is received in a bore 44 of a housing 46 secured to the vehicle 2 (FIG. 1) and is retained therein by a pressing plate 48. The pressing plate 48 is joined to the housing 46 via set screws 50 at any desired angular position relative thereto.

The swivel head 42 includes an adjusting projection 54 with an internally threaded portion for selective engagement with an externally threaded portion 56 on an adjusting device 58 or the mounting portion of a directional horn 60. Thus, the swivel heads 42 and therefore the ultrasonic sensors 40 mounted therein can be individually adjusted within desired angular ranges by means of the adjusting device 58 after the screws 50 have been loosened.

In its bottom portion 61 the housing 46 includes an electronic module 62 which performs the function of the sensor module 22 of FIG. 2 for both sensors 40 in common. Also, the bottom portion includes a plug socket 64 for a flexible cable terminal and a mains module 66 for power supply from the mains.

In addition to receiving and adjusting the ultrasonic sensor 40, the swivel head 42 has the function of capacitively decoupling the ultrasonic sensor 40 from the housing 46.

We claim:

1. A method of safeguarding a vehicle or machinery movable in space, such as a robot, a stacker, or an operatorless transporting vehicle against collision, wherein by the use of distance sensors, especially ultrasonic sensors with echo time measurement, the distance from an obstacle is measured and a reaction signal for acting on the vehicle movement is initiated when predetermined threshold values are not reached, said method comprising the steps of initiating the distance measurements in time synchronism for all sensors, and jointly processing the obtained measuring signals for producing at least a reaction signal.

2. A method as claimed in claim 1, wherein the measuring signal from one of said distance sensors is utilized as a command signal for actively influencing the vehicle movement.

3. A device for safeguarding a vehicle or machinery movable in space, such as a robot, a stacker, or an operatorless transporting vehicle against collision, wherein, by the use of distance sensors, especially ultrasonic sensors with echo time measurement, the distance from an obstacle is measured and a reaction signal is initiated when predetermined threshold values are not reached, comprising:

a time module (20) for initiating the measuring operations of all said distance sensors (40) in time-synchronism, and then clocking the measuring operations of all said sensors, a comparator module (24, 26) for comparing the measured distance values from the individual distance sensors (40) with the threshold values and providing the reaction signal when said threshold values are not reached, an output module for identifying a triggering one of said distance sensors and an interface (36) for converting the reaction signal to a signal for influencing the drive unit of the system.

4. A device as claimed in claim 3, wherein each distance sensor (40) is an ultrasonic sensor and is interconnected with a sensor module (22) for initiating and preprocessing of the measuring signal.

5. A device as claimed in claim 3, wherein the threshold values can be preset in the comparator module (24, 26) either individually, in groups, or jointly so as to be identical for all distance sensors, and said threshold values are variable.

6. A device as claimed in claim 3, wherein said comparator module comprises two submodules, one submodule containing predetermined threshold values for a speed reduction signal and the other one containing predetermined threshold values for a stop signal.

7. A device as claimed in claim 3, wherein the threshold values are inputted into the comparator module (24, 26) via an encoding switch (30) or by radio.

8. A device for safeguarding a vehicle or machinery movable in space, such as a robot, a stacker, or an operatorless transporting vehicle against collision, wherein, by the use of ultrasonic sensors with echo time measurement, the distance from an obstacle is measured and a reaction signal is initiated when predetermined threshold values are not reached, comprising a receiving means fixed on the vehicle (2) for adjustably mounting said sensors at presettable angles, said receiving means having means for interchangeably mounting a directional horn and an adjusting projection for presetting said angles.

9. A device as claimed in claim 8, wherein the receiving means is designed for receiving a plurality of individually adjustable ultrasonic sensors (40) and a sensor module common to said ultrasonic sensors, said sensor module being an electronic module (62).

10. A device as claimed in claim 8, wherein the receiving means includes a housing (46) having a bore (44) for exchangeably accommodating a spherical swivel head (42) which contains the ultrasonic sensor (40) and after adjustment by means of screws (50) can be fixed in the adjusted position in the housing (46).

11. The method as defined in claim 1 wherein said distance measurements are initiated simultaneously.

12. The device as defined in claim 3 wherein said measurement operations are initiated simultaneously.

13. A device as claimed in claim 10, wherein the swivel head (42) is designed to provide for capacitive decoupling of the ultrasonic sensor (40) from the housing (46).

14. A device as claimed in claim 4, wherein the threshold values can be preset in the comparator module (24, 26) either individually, in groups, or jointly so as to be identical for all distance sensors, and said threshold values are variable.

15. A device as claimed in claim 6, wherein the threshold values are inputted into the or each comparator module (24, 26) via an encoding switch (30) or by radio.

16. A device for safeguarding a vehicle movable in space against collision comprising:
    plural ultrasonic sensors capable of measuring the distance from the vehicle to an obstacle; and
    receiving means for adjustably mounting said ultrasonic sensors at predetermined angles relative to the vehicle, said receiving means comprising:
        a housing having a bore for accommodating an adjustably directed swivel head containing one of said ultrasonic sensors,
        said swivel head having a projection for removably receiving an adjusting device for positioning said head and thereby the ultrasonic sensor contained therein, at one of said predetermined angles.

17. The device as defined in claim 16 wherein said projection interchangeably receives a directional horn and said adjusting device.

18. A method of safeguarding a vehicle movable in space against collision with an obstacle, said vehicle having a plurality of sensors for emitting signals related to determining the distance from the vehicle, comprising the steps of:
    (a) transmitting said signals from all said sensors simultaneously;
    (b) receiving reflections of said signals that are reflected from an obstacle back to said vehicle; and
    (c) jointly processing said reflections by:
        (i) measuring the elapsed time between transmitting said signals and the time of receipt of said reflections,
        (ii) making a first comparison of said measured elapsed time to a first predetermined elapsed time threshold,
        (iii) generating a first reaction signal responsively to said first comparison for stopping said vehicle when said measured elapsed time is less than said first threshold,
        (iv) making a second comparison of said measured elapsed time to a second predetermined elapsed time threshold, and
        (v) generating a second reaction signal responsively to said second comparison for slowing the speed of said vehicle when said measured elapsed time is less than said second threshold.

19. A device for safeguarding a vehicle movable in space against collision with an obstacle comprising:
    plural sensors for emitting signals and for receiving reflections of said signals from an obstacle;
    a time module for triggering all of said sensors to emit said signals simultaneously and for determining elapsed time between triggering of all said sensors and time of receipt of said reflections by each of said sensors;
    a first comparator module for comparing said determined elapsed time to a first predetermined threshold, said first predetermined threshold being a first predetermined elapsed time from the triggering of all said sensors;
    a first signalling means for generating a first reaction signal responsively to said first comparator for stopping the vehicle when said determined elapsed time is less than said first threshold;
    a second comparator module for comparing said determined elapsed time to a second predetermined threshold, said second predetermined threshold being a second predetermined elapsed time from the triggering of all said sensors longer than said first predetermined elapsed time;
    a second signalling means for generating a second reaction signal responsively to said second comparator for slowing the speed of the vehicle when said determined elapsed time is less said second threshold; and
    means for adjusting said first and second thresholds in said first and second comparators, respectively, for each of said sensors, whereby said first and second thresholds may be the same for all said sensors or different for each of said sensors.

20. The device as defined in claim 3 wherein one of said threshold values is set to enable said comparator module to provide a reaction signal when the distance to an obstacle is approximately ten meters.

21. The device as defined in claim 19 wherein said second predetermined elapsed time relates to a ten meter distance to an obstacle.

* * * * *